Sept. 12, 1939.  G. R. CHURCHILL  2,172,433

ROTARY BRUSH

Filed May 5, 1937

INVENTOR
George R. Churchill
BY
Jas. H. Churchill
ATTORNEY

Patented Sept. 12, 1939

2,172,433

UNITED STATES PATENT OFFICE 2,172,433

ROTARY BRUSH

George R. Churchill, Quincy, Mass.

Application May 5, 1937, Serial No. 140,887

7 Claims. (Cl. 300—21)

This invention relates to rotary brushes and particularly to rotary brushes for use in the industrial arts for cleaning, polishing, coloring, finishing and burnishing metals and other materials.

The present invention relates to a rotary brush of the character in which bristles or other brushing members are initially arranged in individual circumferential rows between individual layers or members of rubber or like solid thermo-plastic material, and in which the individual rubber layers or members are converted by heat and pressure into a vulcanized hub or supporting member of rubber or like thermo-plastic material in which the bristles or other brushing members are firmly held against the disruptive action of centrifugal force at relatively high speeds.

The present invention has for its object to provide a rotary brushing device of the character described in which the supporting member or hub for the brushing members forms part of a unitary vulcanized rubber structure having within said hub a center member provided with a spindle receiving bore, whereby bristles or brushing members of a given or standard length may be used in rotary brushes of different sizes or diameters and have said brushes provided with a spindle bore of the same diameter for the different sizes or of the same diameter for all sizes within limits.

The invention further has for its object to produce the rotary brushing device in a novel manner and with a novel apparatus, as will be described, whereby the unitary vulcanized rubber structure comprising the bristle supporting member and the center member having the spindle bore, may be made from separate or independent layers or pieces of substantially solid rubber or like vulcanizable material, which are normally disconnected.

These and other features of the invention will be pointed out in the claims at the end of this specification.

Figure 1:
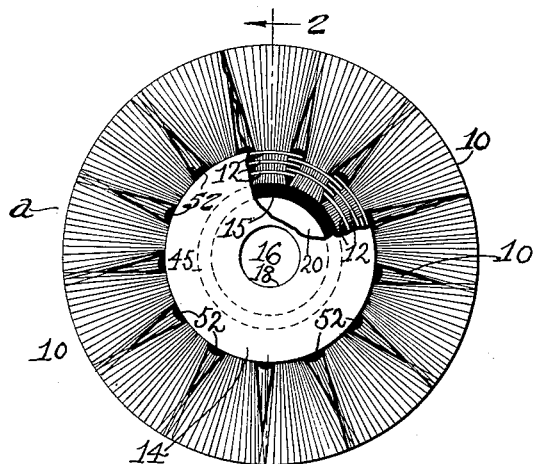
Figure 2:
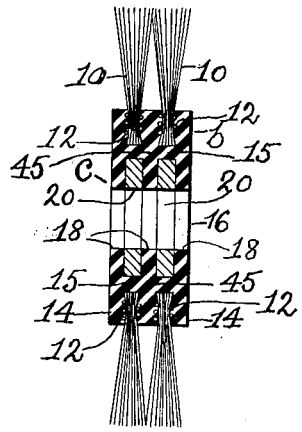
Figure 4:
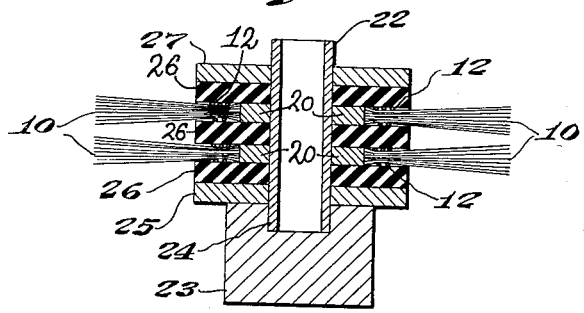
Figure 3:
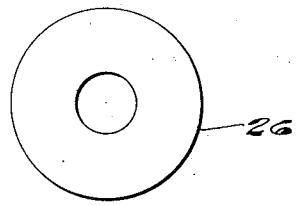
Figure 6:
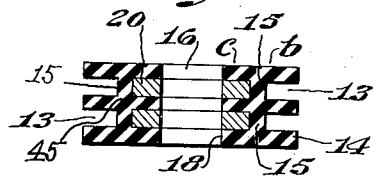
Figure 5:
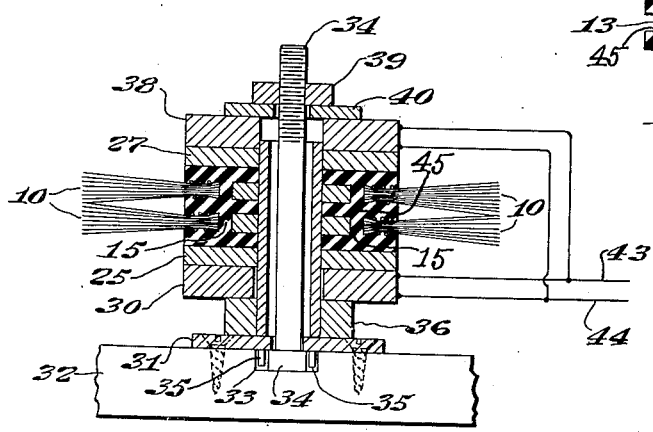

In the accompanying drawing, Fig. 1 is an end elevation with parts broken away of one form of rotary brushing device embodying this invention; Fig. 2 is a vertical section of the brush shown in Fig. 1, taken on the line 2—2; Fig. 3 is an elevation of one of the solid rubber disks employed in the making of the brushing device shown in Figs. 1 and 2; Fig. 4 is a sectional view to illustrate the assembling of the component parts from which the rotary brush represented in Figs. 1 and 2 is made; Fig. 5 is a sectional view to illustrate a form of apparatus with which the rotary brush shown in Figs. 1 and 2 may be vulcanized and the separate rubber members thereof formed into a unitary vulcanized structure; and Fig. 6 is a sectional view on an enlarged scale of the unitary rubber structure with the brushing members omitted.

Referring to the drawing, $a$ represents a rotary brushing device embodying this invention. The rotary brush $a$ may be provided with one or more rows or layers 10 of brushing members and in the present instance is shown as provided with two rows. The brushing members may be bristles of tampico, horse hair, china bristles or other brushing members. The brushing members in each row 10 may and preferably will be reinforced at their butt or inner ends, preferably by wires 12 which are woven to form sheds in each of which bunches of bristles are inserted and firmly held, and the ends of the weaving wires in each row are preferably secured together to form a closed ring of bristles.

The annular rows 10 of bristles or brushing members are located in circumferential grooves or channels 13 in a compressed and vulcanized rubber hub or supporting member $b$ for said brushing members 10, said channels having side walls 14 and a bottom wall 15.

The bristle supporting member or hub $b$ is provided with a center member $c$ integral with it and having a spindle bore 16 of materially smaller diameter than the inner diameter of the bottom wall 15 of the hub or supporting member $b$.

The spindle engaging center member $c$ is provided with vulcanized rubber members 18 extended inwardly from the inner surface of the bristle supporting member or hub $b$ and are separated by disks 20 of substantially firm yet yieldable material, preferably cardboard, which assist to form the bottom walls of the channels 13 and also act to cushion the vulcanized rubber center portion $c$ and relieve it from the liability of being fractured when the rotary brushing device is clamped upon the spindle, not shown, upon which the rotary brushing device is mounted.

In the manufacture of the rotary brushing device provided with two rows or layers of bristles as herein shown, it is preferred to employ on assembling apparatus shown in Fig. 4 and a vulcanizing apparatus shown in Fig. 5.

The assembling apparatus includes a tube or mandrel 22 preferably of metal and of substantially the size or diameter of the spindle on which the finished rotary brushing device is to be mounted.

The mandrel 22 is erected upon a suitable base 23 provided with a socket 24 into which the lower end of the mandrel is extended. A metal plate 25 is placed on the mandrel 22 and a disk 26 of unvulcanized rubber is placed on the mandrel 22 to rest on the metal plate 25. A cardboard disk 20 of smaller diameter than the rubber disk or layer 26 is fitted on the mandrel 22 and a ring of bristles or brushing members 10 is placed around the cardboard disk 20. A second disk of rubber 26 is then placed on the mandrel 22 to rest on the cardboard disk 20 and on the ring of brushing members 10 surrounding the cardboard disk. A second cardboard disk 20 and ring of bristles or brushing members 10 are next placed on the mandrel, and a third disk of rubber 26 is placed on the mandrel to rest on the second cardboard disk and the ring or row of bristles 10 surrounding it. A top metal plate 27 is next placed on the mandrel.

The mandrel 22 and the parts assembled thereon are then placed in the vulcanizing apparatus shown in Fig. 5. The vulcanizing apparatus is provided with a bottom heating plate or member 30 having a hole through which the mandrel 22 is passed to rest on a metal plate 31 secured to a base 32 having a socket 33 in which is located the head of a bolt 34, which is held from rotation by fingers or bars 35 on the under side of the metal plate 31. The bolt 34 is extended above the metal tube or mandrel 22, and the lower heating plate or member 30 preferably rests on a bushing or collar 36 interposed between the heating member 30 and the metal plate 31. The metal plate 25 mounted on the mandrel 22 rests on the lower heating member 30 and a top heating plate or member 38 is placed on the mandrel 22 and rests on the top metal plate 27. The component parts of the brush are subjected to an initial pressure by means of a nut 39 on the bolt 34, which nut rests on a washer or cross bar 40 resting on the upper heating members 38. The heating members 30, 38 may be heated by steam or other medium or as herein represented they may be heated by current supplied by a circuit 43, 44 in a manner well understood.

After the individual members of the brush have been initially compressed, the heat is turned on and continued for a length of time sufficient to allow the rubber members 26 to become plastic or flowable, and when this condition arises, the nut 39 is further turned up to increase the pressure, which causes the rubber disks 26 to be compressed and a portion thereof to be forced between the cardboard disks 20 and the rings of bristles 10, causing the latter to be moved outwardly and leave an annular space between the inner circumference of the bristles 10 and the outer circumference of the cardboard disk 22, which spaces are filled with an annular wall 45 of rubber which also forms the bottom wall 15 of annular recesses or channels 13 in which the butt ends of the rows of bristles 10 are located, after the manner represented in Fig. 5.

The portion of the individual rubber disks 26 which is forced between the cardboard disks 20 and the bristles 10, cooperates with the rubber disks now reduced in thickness, to form a unitary vulcanized rubber structure, which is provided with a vulcanized rubber hub b having circumferential channels or grooves 13 in which the bristle or other brushing members are firmly held, and is further provided with a center member having the spindle receiving bore 16, whose circumferential wall is composed in part of vulcanized rubber members integral with the bristle holding rubber hub b extended inwardly therefrom, as clearly represented in Figs. 5 and 6. After the unitary rubber structure has been cooked or vulcanized, the current is cut off from the heating plates and the vulcanized rubber hub may be allowed to cool in the vulcanizing apparatus, or as is preferred, the brushing device may be removed from the vulcanizing apparatus and again placed under pressure and allowed to cool and harden.

This may be effected by mounting the tube or mandrel 22, the metal plates 25, 27 and the interposed brushing unit or section on a bolt, not shown, but which is provided with a nut by which the pressure may be restored to the unitary rubber structure, which is then allowed to cool and harden under pressure.

When the rubber is thus cooled, the pressure is removed, the end plates 25, 27 and the mandrel 22 removed, the surface trimmed, and the device is ready for use.

From the above description, it will be seen that the rubber of the initially non-plastic and disconnected rubber disks or members is subjected to heat to render them plastic, and when in this condition are subjected to pressure to cause the rubber to move or flow in two directions, namely axially and radially with relation to the mandrel on which the rubber disks are mounted. In the axial movement of the rubber, the rubber disks or layers are materially reduced in thickness and portions thereof form an axial or transverse wall between the outer and inner circumferences of the unitary rubber structure. As the plastic rubber is moved axially, portions thereof are caused to move radially so as to materially reduce the thickness of the side walls of the channels or grooves in which the brushing members are located, and such rubber portions are also simultaneously moved axially into the spaces between the bunches of bristles beyond the reinforcing wires 12 to overlap the latter and form, when cooled, locking projections 52 of rubber which assist in retaining the bristles or brushing members in fixed relation to the unitary rubber structure against displacement by centrifugal force at relatively high speeds.

After the additional pressure has been applied to the rubber members of the brush section or unit, they are further subjected to heat until the rubber members are completely cooked or vulcanized.

The portions of the unitary rubber structure within the axially extended wall 45, cooperate with the cardboard disk to provide the unitary rubber structure with a spindle bore having a circumferential wall composed in part of vulcanized rubber, which resists wear and enlargement of the spindle bore under conditions of use and permits the brushing unit or section to be taken off and put on the spindle without rendering the brushing unit or section out of balance.

The cardboard disks cooperate with the hard rubber portions of the spindle bore 16 to cushion the same and prevent fracture when clamped on the spindle with the usual metal end clamping plates or disks, not shown, provided with central holes or bores, which are of substantially the diameter or size of the spindle, not shown, upon which the brushing device is mounted when in operation, which diameter of spindle is the same as that of the mandrel 22 on which the separate disks 20, 26 are assembled.

The rotary brushing member, as shown in Figs. 1 and 2, is provided with two rows of brushing members, but it is not desired to limit the invention in this respect as the brushing device may be provided with one or more rows of brushing members to meet conditions of use. The brushing unit herein shown and described forms a brush section or unit, a plurality of which may be mounted on a spindle to form a rotary brush of any desired length within limits.

Having thus described the invention, what is claimed is:

1. A rotary brushing device having a vulcanized rubber unitary core structure provided with a circumferential channel or groove, brushing members located in said channel or groove, and a non-vulcanizable member encased in said unitary rubber core structure between layers of vulcanized rubber and separated from said brushing members by the bottom wall of said channel or groove.

2. A rotary brushing device having a vulcanized rubber unitary core structure provided with a circumferential channel or groove, brushing members firmly secured in said channel or groove, and a disk of cushioning material encased in said unitary core structure between layers of vulcanized rubber and separated from said brushing members by the bottom wall of said channel or groove.

3. The method of making rotary brushing devices, which consists in assembling an annular layer of brushing members with the brushing members substantially radially disposed between layers of solid rubber separated from each other by said brushing members, subjecting the parts thus assembled to heat to render the said layers of rubber plastic, and when plastic to pressure to compress portions of said rubber layers into intimate contact with said brushing members and to cause other portions of said rubber layers to be forced under the inner ends of said brushing members and be welded together and form a unitary supporting member of vulcanized rubber for said brushing members.

4. The method of making a rotary brush comprising assembling superposed layers of brushing members upon a mandrel between layers of vulcanizable rubber composition with the rubber composition disposed to form in effect a hub for the brushing members and subjecting the hub section of the assembly to heat and to axial pressure whereby to cause the rubber composition to flow under the inner ends of the brushing members and to be forced between the brushing members and upon vulcanization to form a unitary hub of vulcanized rubber in which the brushing members are secured.

5. The method of making a rotary brush comprising assembling superposed layers of brushing members upon a mandrel between layers of vulcanizable rubber composition with the rubber composition disposed to form in effect a hub for the brushing members and subjecting the hub section of the assembly to heat and to axial pressure whereby to cause the rubber composition to flow under the inner ends of and around the brushing members, subjecting the assembly to additional axial pressure and continuing the heating until vulcanization is completed.

6. The method of making a rotary brush comprising positioning a plurality of circular strips of connected brushing material upon a mandrel, interposing vulcanizable rubber composition in sheet form between the lateral surfaces of adjacent circular strips at the inner ends thereof and upon the outer surfaces of the endmost circular strips, then subjecting the rubber strips and the inner end portions of the brushing members to heating at a temperature sufficiently high to render the rubber flowable and to axial pressure whereby to cause the rubber to flow around the individual brushing members and also under the inner ends thereof, and then subjecting the assembled brushing members and partially vulcanized rubber layers to additional axial pressure and continuing the heating under pressure until the rubber becomes vulcanized and hard.

7. In a rotary brush adapted for high speed rotation, an integral substantially cylindrical hub of vulcanized rubber having an axial aperture therethrough by which the hub may be mounted for rotation, a plurality of bunches of bristles arranged in at least one row extending around said hub, each of said bunches extending substantially radially of said hub and having one end extending a substantial distance into said hub, the rubber of said hub extending around said end of each said bunch between the bunches of said row and conforming to the shape thereof when said hub is free of axial compression so that said end of each said bunch is embedded in the rubber of said hub to secure the same against the action of centrifugal force under high speed rotation, and an annular non-vulcanizable member encased in said integral rubber hub member between layers of vulcanized rubber and positioned radially inwardly of said bunches.

GEORGE R. CHURCHILL.